(12) United States Patent
Leyden et al.

(10) Patent No.: US 7,628,551 B2
(45) Date of Patent: Dec. 8, 2009

(54) SECURITY SURVEILLANCE SYSTEM AND METHOD OF OPERATING SAME

(75) Inventors: Roger Leyden, Inverness, IL (US); Terrance Surma, Carol Stream, IL (US)

(73) Assignee: Se-Kure Controls, Inc., Franklin Park, IL (US)

( * ) Notice: Subject to any disclaimer, the term of this patent is extended or adjusted under 35 U.S.C. 154(b) by 624 days.

(21) Appl. No.: 11/411,743

(22) Filed: Apr. 26, 2006

(65) Prior Publication Data

US 2007/0253702 A1     Nov. 1, 2007

(51) Int. Cl.
    *G03B 17/00*     (2006.01)
(52) U.S. Cl. ...................................... 396/427; 348/143
(58) Field of Classification Search ................. 396/427; 348/143
    See application file for complete search history.

(56) References Cited

U.S. PATENT DOCUMENTS 5,418,567 A * 5/1995 Boers et al. ................. 348/375
2004/0057717 A1 * 3/2004 Arbuckle et al. ............ 396/427
2006/0024046 A1 * 2/2006 Jones et al. .................. 396/427
2006/0147194 A1 * 7/2006 Jones .......................... 396/427
2007/0109407 A1 * 5/2007 Thompson ................... 348/143
2008/0055409 A1 * 3/2008 Mars et al. ................... 348/143

OTHER PUBLICATIONS

Se-Kure Controls, Inc. 2005 Catalog No. 105, pp. 28-29.

\* cited by examiner

*Primary Examiner*—Christopher Mahoney
(74) *Attorney, Agent, or Firm*—Wood, Phillips, Katz, Clark (57) ABSTRACT

A security surveillance system having a support, a surveillance device mounted on the support, and a cover assembly. The cover assembly is movable selectively relative to the support between an access state and an operative state. In the access state, at least a first operating state of the surveillance device can be changed by an operator at or in the vicinity of the surveillance device. In the operative state, the cover assembly blocks access by an operator. The cover assembly has a first component and the support has a second component. The first and second components are mutually attracted to each other.

16 Claims, 6 Drawing Sheets

SECURITY SURVEILLANCE SYSTEM AND METHOD OF OPERATING SAME

BACKGROUND OF THE INVENTION

1. Field of the Invention

This invention relates to security surveillance systems of the type having a security device that is selectively accessed through a cover assembly.

2. Background Art

Security surveillance systems are used in many environments. The surveillance system may include one or more cameras that may be either fixed or movable, as to scan a particular space. The security camera may be set up to monitor the performance of employees or observe behavior of customers in a commercial establishment. Alternatively, the camera may be set up to detect intruders. As a further alternative, the camera may be set up to provide an ongoing recorded image of a space that can be retrieved should an event occur in a particular monitored space that requires investigation. Cameras are used commonly for these and other purposes.

In some environments, a surveillance camera is clearly exposed to view. By observing the camera, its focal region can be generally ascertained by those in the vicinity thereof.

In many environments, direct viewing of the camera is obstructed by a wall or cover assembly. The camera may be recessed within a space that is blocked by a one-way or translucent wall component. In another arrangement, a "dome" is provided on a support surface and likewise obstructs clear viewing of the camera that resides within a receptacle covered by the dome. The dome may likewise be made from a material that permits only one-way viewing or is translucent so that viewing therethrough is obstructed.

The use of domes occurs commonly for a number of different reasons. The presence of a dome in a space generally alerts those in the vicinity that their actions may be observed, as by a security team, or recorded. Placement of a dome in a central location, whereat imaging of an entire space may be possible, potentially gives all persons in that space a belief that their actions are being monitored. A deterrent effect may result from the presence of the dome, even if there is no surveillance camera covered thereby.

There are a number of different manners in which the cameras are mounted and covered so that their presence and nature cannot be easily discerned. As noted above, the camera may be mounted in a recess on a flat wall in a space that is blocked by a flat or contoured cover assembly.

In a more common configuration, a dome is utilized and is mounted on a support. Commonly, the dome projects from a flat ceiling or wall surface at a location whereat a panoramic view of a space is possible.

In another common configuration, the support for the dome includes an elongate tubular element that projects from a ceiling or a vertically extending wall.

Regardless of the particular mounting, the cameras are generally situated so that they are not in easy reach of an individual that would be tempted to tamper with the camera, as to potentially permit disabling thereof. Consequently, when the need arises to change an operating state of the camera, be it to clean, change the direction of focus, change the range of focus, etc., an operator generally needs to use a ladder or lift to gain the required access.

It is common with conventional surveillance systems of the above type for the cover assembly to be maintained on the support using separate fasteners. The fasteners may be threaded fasteners, which require turning with either a tool or by hand. By reason of including manipulable fasteners, these conventional systems inherently present a danger to an operator that is precariously situated on a ladder. The operator is generally required to hold the cover assembly with one hand and manipulate the fasteners with the other. The normally separable fasteners must at the same time be collected as they are removed, after which the cover assembly is generally fully separated from the support and placed in an appropriate, accessible location so that it can be picked up and reinstalled. The operator is thus required to coordinate the handling of the tools, fasteners, and cover assembly while maintaining his/her balance on a ladder or lift.

In an alternative form, the cover assembly is assembled and disassembled using a twist lock arrangement. This operation is likewise difficult, and potentially dangerous, to perform with the installer precariously situated on a ladder or lift.

The need for a cover assembly that can be easily repositioned from a ladder, while maintaining the cover assembly firmly in place during use, exists.

SUMMARY OF THE INVENTION

In one form, the invention is directed to a security surveillance system having a support, a surveillance device mounted on the support, and a cover assembly. The cover assembly is movable selectively relative to the support between an access state and an operative state. In the access state, at least a first operating state of the surveillance device can be changed by an operator at or in the vicinity of the surveillance device. In the operative state, the cover assembly blocks access by an operator as would permit changing of the first operating state by an operator at or in the vicinity of the surveillance device. The cover assembly has a first component and the support has a second component. The first and second components are mutually attracted to each other and located so that an operator can move at least a part of the cover assembly with the cover assembly in the access state in: a) a first path in a first direction as an incident of which the cover assembly is caused to be placed in the operative state and maintained in the operative state by a first attractive force between the first and second components; and b) the first path in a direction opposite to the first direction with the cover assembly in the operative state, at least initially under a force greater than the first force, to thereby change the cover assembly from the operative state into the access state.

In one form, one of the first and second components is made from a magnetized material and the other of the first and second components is made from at least one of: a) a magnetized material; and b) a metallic material.

With the cover assembly in the access state, at least part of the cover assembly may be fully separated from the support.

The security surveillance system may further include a tether for connecting a part of the cover assembly to the support with the cover assembly in the access state.

The support may include a wall and a bracket assembly on the wall.

In one form, the surveillance device is in the form of a camera.

The part of the cover assembly may be movable in substantially a straight line in the first path.

In one form, the cover assembly has a third component and the support has a fourth component, with the third and fourth components mutually attracted to each other and located so that the cover assembly is maintained in the operative state cooperatively by the first attractive force and a second attractive force between the third and fourth components.

In one form, the third and fourth components are caused to be attracted to each other as an incident of the at least part of the cover assembly being moved in the first path in the first direction with the cover assembly initially in the access state.

In one form, the cover assembly is in the form of a shield member having opposite first and second sides. The first side is exposed to the surveillance device. The shield member obstructs viewing of the surveillance device from at the second side of the shield member.

The shield member may have a convex shape at the second side thereof.

In one form, the cover assembly includes a separate collar that extends around the shield member and the first component is on the collar.

In one form, the support consists of a wall and a bracket on the wall and the second component is on the bracket.

The bracket may include an elongate tubular element.

In one form, the support includes a housing defining a receptacle for the surveillance device.

The receptacle may be spaced from the wall.

The invention is further directed to a method of operating a security surveillance system. The method includes the steps of: providing a support, a surveillance device on the support, and a cover assembly; and joining the cover assembly to the support with the cover assembly initially in an access state wherein at least a first operating state of the surveillance device can be changed by an operator at, or in the vicinity of, the surveillance device, by repositioning at least a part of the cover assembly relative to the support, as an incident of which the cover assembly achieves, and is maintained in, an operative state, wherein the cover assembly blocks access by an operator as would permit changing of the first operating state, at or in the vicinity of the surveillance device.

In one form, the step of providing a support and a cover assembly involves providing a support with a first component and a cover assembly with a second component, with the first and second components mutually attracted to each other with a first force of a first magnitude with the cover assembly in the operative state.

The method may further include the step of changing the cover assembly from the operative state into the access state by exerting a force on the at least part of the cover assembly with a magnitude that exceeds the first magnitude.

The step of joining the cover assembly to the support may involve joining the cover assembly to the support so that the cover assembly is maintained in the operative state by an attractive force without requiring separate fasteners.

The invention is further directed to a method of operating a security surveillance system. The method includes the steps of: providing a support, a surveillance device on the support, and a cover assembly, with the cover assembly maintained in an operative state by a first force of a first magnitude between the support and at least a part of the cover assembly, wherein the cover assembly blocks access as would permit changing of a first operating state of the surveillance device by an operator at or in the vicinity of the security device; changing the cover assembly from the operative state into an access state by exerting a force of a magnitude in excess of the first magnitude upon the at least part of the cover assembly tending to draw the at least part of the cover assembly away from the support; and with the cover assembly in the access state, changing the first operating state of the surveillance device from at, or in the vicinity of, the surveillance device.

The method may further include the step of changing the cover assembly from the access state into the operative state and thereby causing the cover assembly to be maintained in the operative state as an incident of repositioning the at least part of the cover assembly relative to the support.

DETAILED DESCRIPTION OF THE DRAWINGS

Figure 1:
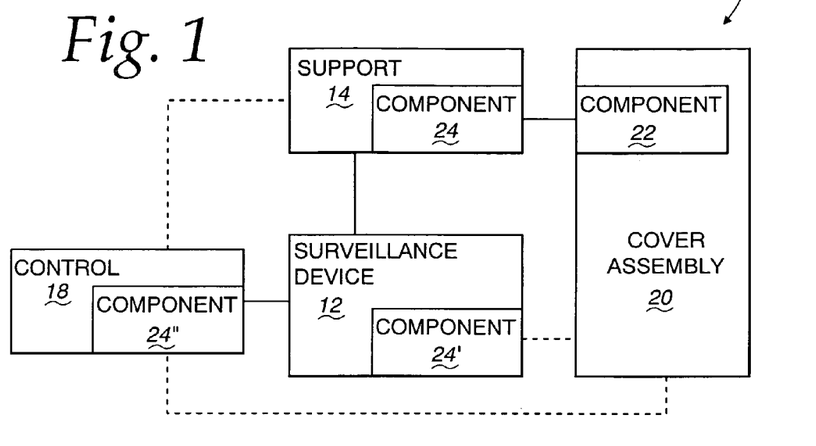
FIG. 1 is a schematic representation of a security surveillance system, according to the present invention, and consisting of a support, a surveillance device upon the support, and a cover assembly for selectively blocking an operator or third person from changing an operating state of the surveillance device.

As shown in FIG. 1, the invention is directed to a security surveillance system at 10 consisting of a surveillance device 12 that is mounted upon a support 14. The surveillance device 12 is typically a camera for generating images of a space in either a stationary or a scanning mode. The nature of the surveillance device 12 is such that it is normally required to be accessed to change operating states thereof. There are virtually a limitless number of different operating states for the surveillance device 12 that may be changed by an operator. For example, the operator may change the operating state by cleaning a lens, changing the direction of focus of the camera, its scanning time, its focal length, etc. This changing of the operating state may occur directly at the surveillance device 12, or at a control 18 in the vicinity of the surveillance device 12. The control 18 may be directly upon the surveillance device 12 and/or upon the support 14.

A cover assembly 20 is mounted upon the support 14, the surveillance device 12, and/or the control 18 and is changeable selectively between: a) an access state wherein at least a first operating state of the surveillance device 12 can be changed by an operator, at or in the vicinity of the surveillance device 12; and b) an operative state wherein the cover assembly blocks access by an operator to the surveillance device 12 and/or the control 18, as would permit changing of the first operating state by an operator at, or in the vicinity of, the surveillance device.

The cover assembly 20 has a component 22 that cooperates with a component 24 on the support 14 to maintain the cover assembly 20 in the operative state. Preferably, the components 22, 24 are mutually attracted to each other and are engaged by moving at least a part of the cover assembly 20 with the cover assembly 20 in the access state in: a) a first path in a first direction as an incident of which the cover assembly 20 is caused to be placed, and maintained, in the operative state by a first attractive force between the first and second components; and b) the first path in a direction opposite to the first direction with the cover assembly in the operative state at least initially under a force greater than the first force to thereby change the cover assembly from the operative state into the access state.

Like components 24', 24" may be provided on the surveillance device 12 and control 18 to cooperate with the component 22, or other like component, in a like manner, to maintain the cover assembly 20 in the operative state.

A more specific form of the security surveillance system 10 will now be described with respect to FIGS. 2-7. The support 14 consists, in this embodiment, of a vertical wall 26, a gooseneck-shaped, elongate, tubular element 28 connected to the vertical wall 26 through a plate 30, a bracket assembly 32 at the bottom 34 of the tubular element 28, and a cup-shaped housing 36.

The bracket assembly 32 consists of an A-shaped frame 38, at the top of which a collar 40 is provided to secure the bracket assembly 32 to the bottom 34 of the tubular element 28 in depending fashion. The frame 38 has a cross bar 42 that supports a separate mounting frame 44 for the surveillance device 12, that is shown in the form of a camera. The mounting frame 44 is U-shaped with spaced legs 46, 48 joined by a cross bar 50. The camera 12 has associated pivot arms 52 (one shown in FIG. 5), which project oppositely through the legs 46, 48 to guide pivoting movement of the camera 12 around an axis 54. The ends 56 of the pivot arms 52 are threaded, each so as to accept a single wing nut 58. The wing nuts 58 can be hand operated to be loosened, to allow repositioning of the camera 12. Once a desired orientation of the camera 12 is selected, the wing nuts 58 can be re-tightened.

Figures 4, 5:
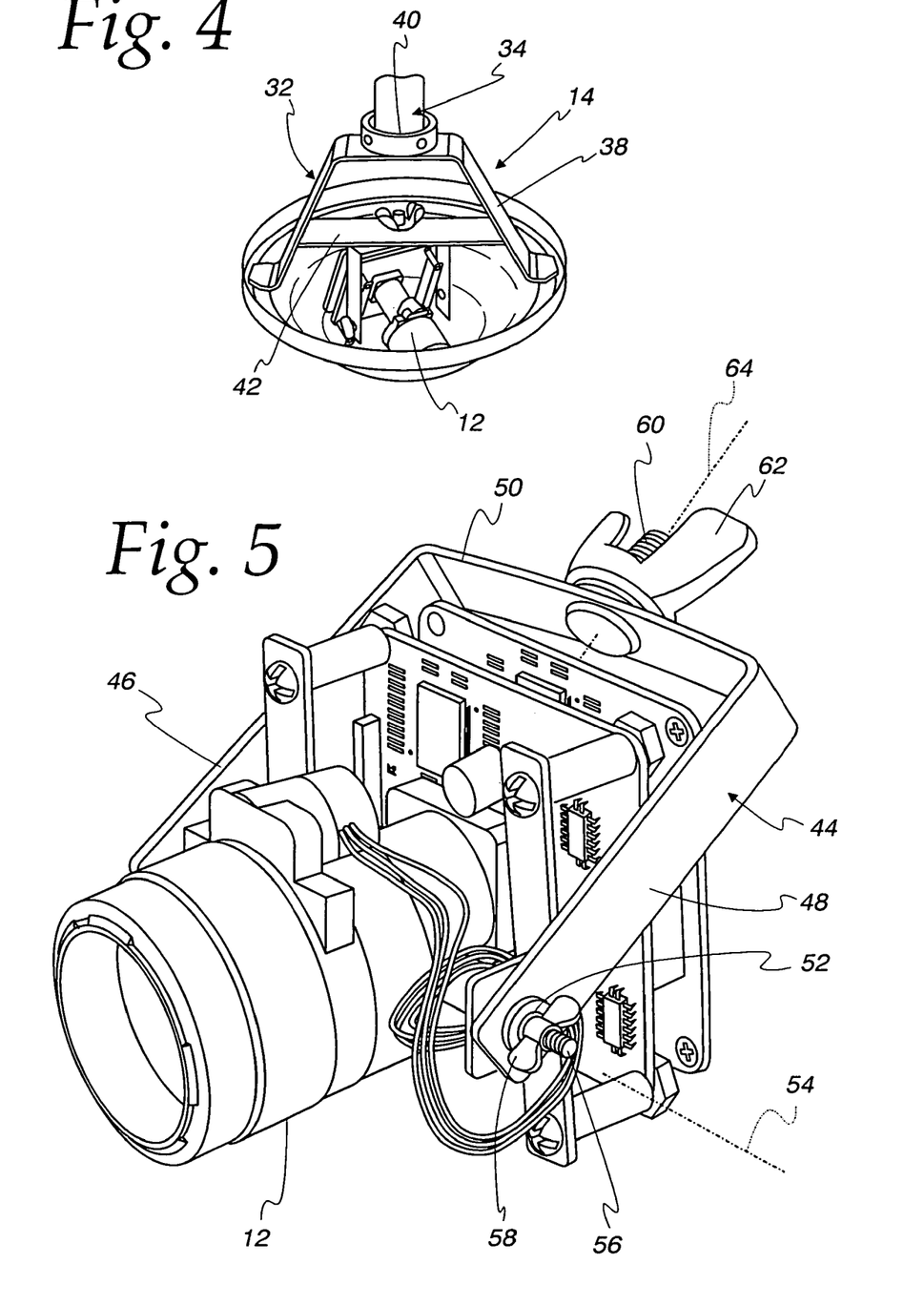
FIG. 4 is an enlarged, fragmentary, top, perspective view of a part of the support on the security surveillance system in FIGS. 2 and 3, including a bracket assembly, with the cover assembly in an operative state on the support.
FIG. 5 is an enlarged, perspective view of the surveillance device in the system in FIGS. 2-4.

The mounting frame 44 has a projecting, threaded post 60 that extends upwardly through the cross bar 42 on the frame 38 and is secured by a wing nut 62. The wing nut 62 is likewise hand operable. With the wing nut 62 loosened, the mounting frame 44 and camera 12 thereon can be guidingly pivoted around a vertical axis 64 to allow the camera 12 to be oriented as desired. With the desired orientation established, the wing nut 62 can be tightened.

Figure 2:
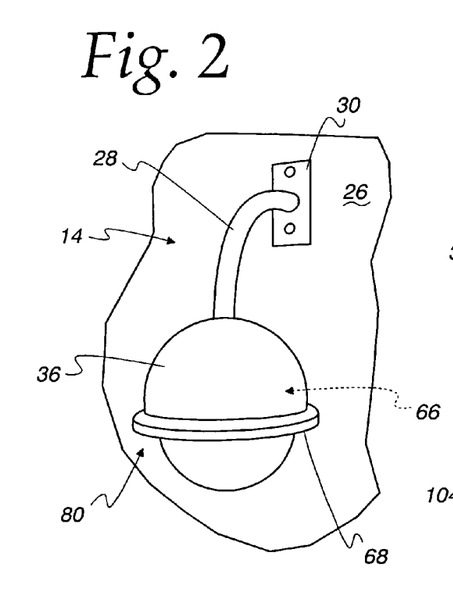
FIG. 2 is a front, perspective view of one specific form of the security surveillance system in FIG. 1 and with the cover assembly in an operative state.
Figure 3:
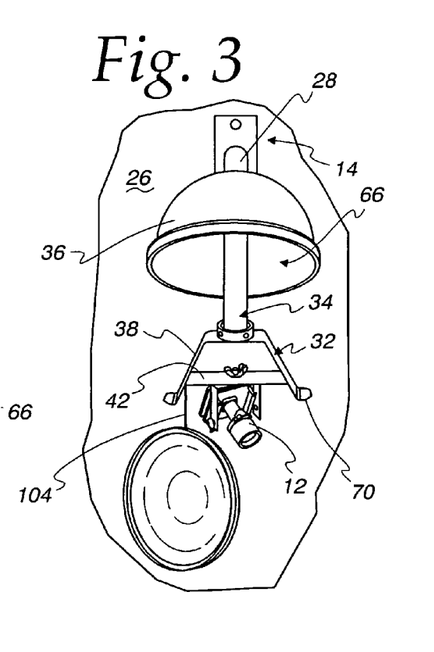
FIG. 3 is a front, perspective view of the security surveillance system of FIG. 2, from a different angle than in FIG. 2, and with the cover assembly in an access state.

The housing 36 is dimensioned to define a receptacle 66 for the bracket assembly 32 and the camera 12 mounted thereupon. The housing 36 is selectively, guidingly slidable along the tubular element 28 between an operative position, as shown in FIG. 2, and a retracted position, as shown in FIG. 3.

In the retracted position, the housing 36 is situated so that the bracket assembly 32 and camera 12 thereupon are exposed for installation, maintenance/repair, adjustment, etc. With the housing 36 in the operative position, the bottom 68 of the housing 36 extends vertically, to adjacent or below, the bottom 70 of the bracket assembly 32.

Figure 7:
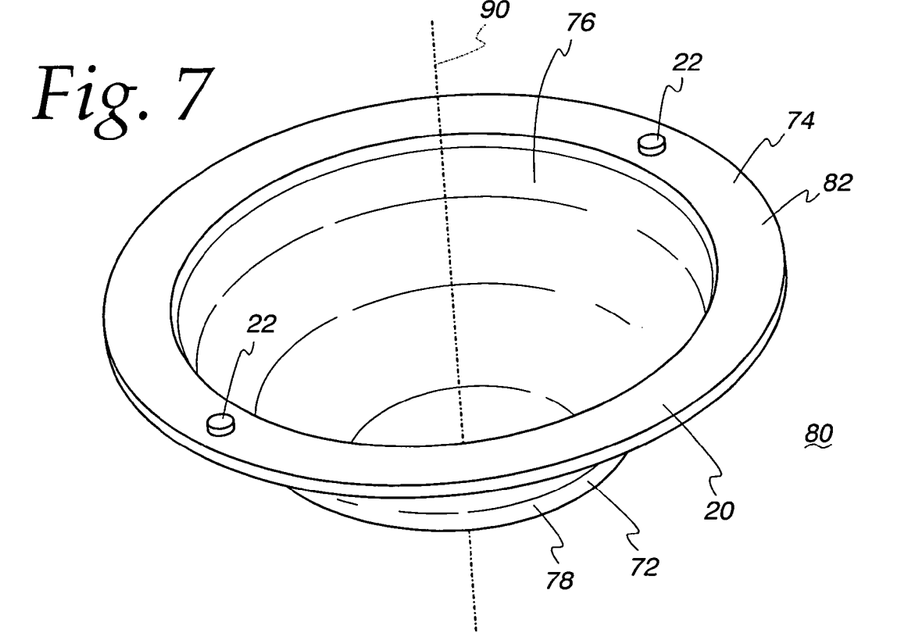
FIG. 7 is an enlarged, top, perspective view of the cover assembly shown in FIGS. 2-4.

The cover assembly 20 in this embodiment is made as a single piece, though this is not a requirement. The cover assembly 20 consists of a dome-shaped shield member 72 that terminates in an upper, integral, outturned flange 74. The shield member 72 has a concave inner side 76 and a convex outer side 78. The shield member 72 can be made from a material that permits only one-way viewing so that the camera 12 can generate images from the inner side 76 of the surrounding space 80, while viewing of the camera 12 is obstructed from the outer side 78. Alternatively, the shield member 72 can be made from a translucent or darkened material that obstructs, but does not fully block, viewing of the camera 12 through the shield member 72 from the outer side 78. As a further alternative, the shield member can be made from a clear material, however this is not preferred.

Figure 6:
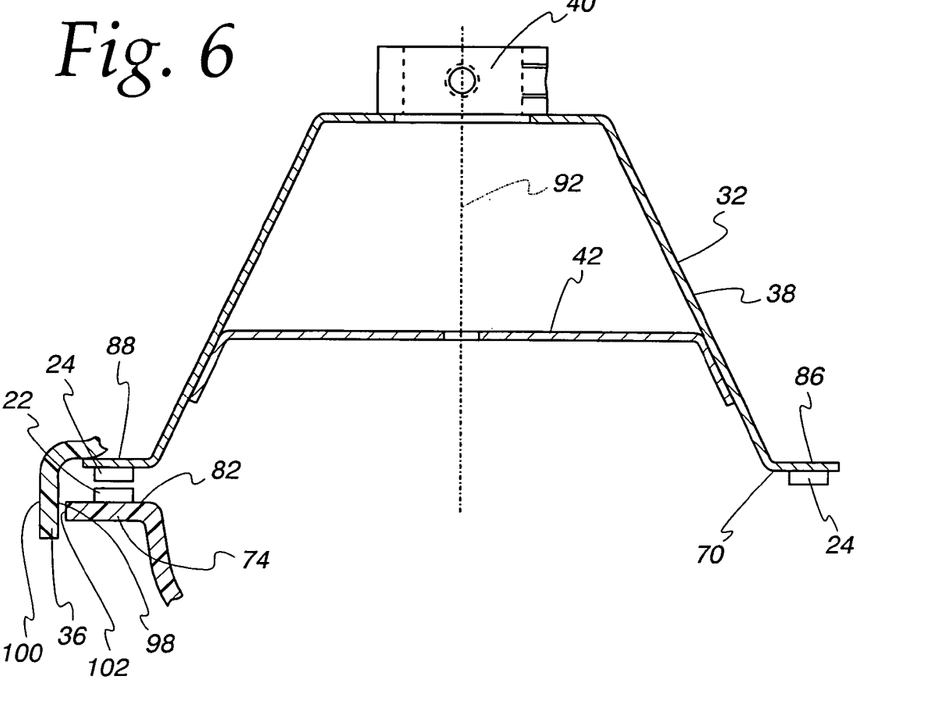
FIG. 6 is an enlarged, elevation view of the bracket assembly shown in FIGS. 3 and 4, with the surveillance device removed, and showing a fragmentary, cross-sectional view of the cover assembly and a part of the support, that cooperates therewith.

The aforementioned components 22, 24 are provided respectively on an upwardly facing surface 82 on the flange 74 and the bottom 70 of the bracket assembly 32. While it is conceivable that a single pair of components 22, 24 would suffice, in this embodiment, two of the components 22 are provided at diametrically opposite locations to align, one each, with the components 24 on the bottom of outturned ends 86, 88 on the bracket assembly 32.

While one or more discrete, cooperating, "components" are described in specific embodiments hereinbelow, it should be understood that part or all of at least one of the cover assembly 20, the support 12, surveillance device 12, and control 18 may be made from a material that causes the required attraction to maintain the cover assembly 20 releasably in the operative state, thereby obviating the need for the addition of a discrete "component". As used in the description and claims herein, "component" is intended to encompass discrete elements that require controlled alignment to be attracted, as well as other cooperating elements that cooperate with the cover assembly 20 in different, and potentially unlimited, angular orientations.

The nature of the components 22, 24 may vary. Both of the components 22, 24 in each cooperating pair may be made from a magnetized material. Alternatively, one may be metal, with the other magnetized. In the latter case, when one of the components 22, 24 is metal, it is not required that it be a discrete component. For example, the outturned ends 86, 88 may be made from metal to cooperate with the magnetized components 22, as hereinafter described. As a still further alternative, the outturned ends 86, 88 might be magnetized, with the component 22 or the entire surface 82 made from metal that is attracted thereto.

With the cover assembly 20 in the access state therefor, the shield member 72 is fully separated from the bracket assembly 32. Thus, access to the camera 12 is permitted from a bottom location so that the operating state of the camera 12 can be changed directly upon the camera 12, or through the aforementioned control 18, at or in the vicinity of the camera 12. Further accessibility is afforded by being able to reposition the housing 36 to the FIG. 3 position.

To change the cover assembly 20 from the access state into the operative state, the central axis 90 of the shield member 72 is aligned with the central axis 92 of the bracket assembly 32. The shield member 72 is then moved in a first vertical path upwardly to present the components 22 on the shield member 72, one each, at the components 24 on the bracket assembly 32. In close proximity, the components 22, 24 are mutually attracted to each other with a force having a magnitude sufficient to maintain the shield member 72 in the operative state, wherein the shield member 72 blocks access to the camera 12/control 18 as would permit an individual to change the operating state of the camera 12, at or in the vicinity of the camera 12.

Figure 8:
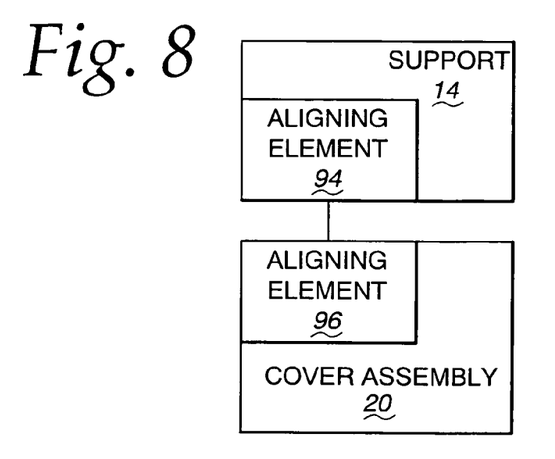
FIG. 8 is a schematic representation of the inventive support and cover assembly and showing aligning elements cooperating therebetween to facilitate placement of the cover assembly on the support.

Accordingly, through a simple press fit step, the cover assembly 20 can be changed from the access state into the operative state. As shown in FIG. 8, if discrete, cooperating components are utilized, aligning elements 94, 96 may be provided on the support 14 and cover assembly 20 to consistently angularly orient the support 14 and cover assembly 20 relative to each other around the axes 90, 92, so that the components 22, 24 consistently align properly for connection. The need for this precise aligning capability is obviated by reason of making one of the components that are mutually attractive substantially larger than the other. Further, as explained above, one of the components may be a metal that is magnetized or non-magnetized to be attracted to the other of the components with any angular relationship between the support 14 and cover assembly 20.

With the housing 36 in the operative position therefor, an inside surface 98 on an annular rim 100 at the bottom of the housing 36 defines a receptacle with a diameter slightly greater than that for the free edge 102 of the flange 74. Through this arrangement, with the housing 36 in the operative state, the shield member 72 can be guided by the inside surface 98 into substantially coaxial relationship with the housing 36 and the bracket 32.

To change the cover assembly 20 from the operative state back into the access state, an operator need only apply a force vertically oppositely that of the assembly force upon the shield member 72, with a magnitude sufficient to overcome the attractive force between the components 22, 24.

With this arrangement, through a simple press fit step, the shield member 72 can be changed from a fully separated, access state into the operative state of FIG. 2. Accordingly, separate fasteners do not have to be handled independently of the support 14 and cover assembly 20.

As an alternative to the use of magnetic attraction, hook and loop-type fastener components might be utilized. However, this is not preferred.

As a further alternative, additional pairs of the components 22, 24 could be utilized.

While the components 22, 24 are shown in the shape of a disk, other shapes that facilitate connection might be utilized, among which are straight, kidney-shaped, etc.

Figure 9:
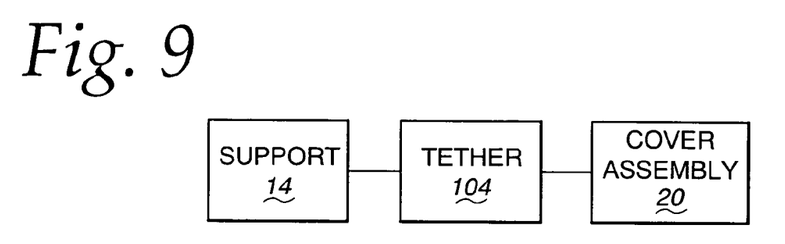
FIG. 9 is a schematic representation of the inventive support and cover assembly with a tether for maintaining the cover assembly attached to the support with the cover assembly in the access state.

As a further convenience, as shown schematically in FIG. 9 and in a specific form in FIG. 3, a tether 104 may be provided to connect the cover assembly 20 to the support 14 with the cover assembly 20 in the fully separated/access state. The tether 104 may be a flexible element, or may have another construction.

Figure 10:
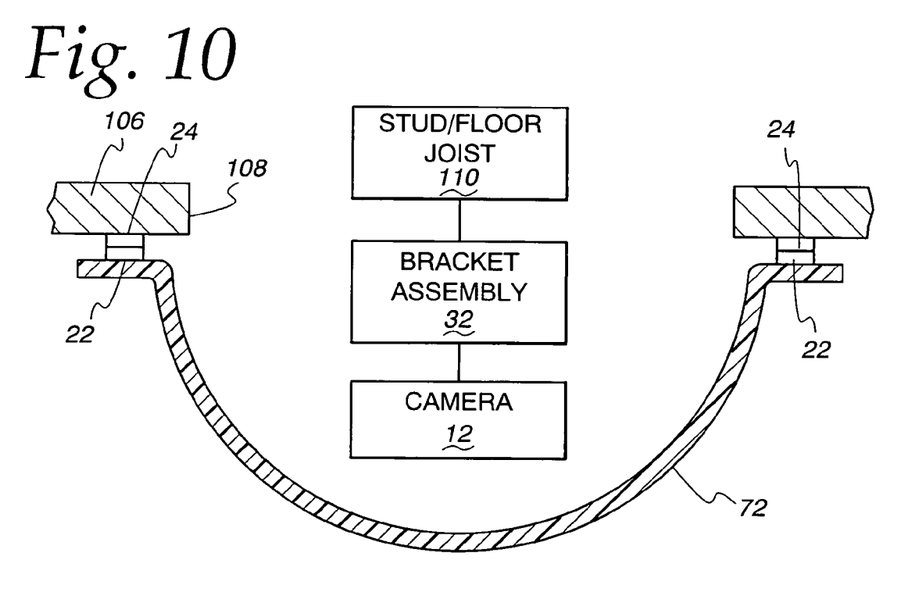
FIG. 10 is a cross-sectional view of a modified form of security surveillance system within a recess on a flat wall.

The support 14 is shown schematically in FIG. 1 since it is intended that virtually a limitless number of different support configurations may be utilized. As just one alternative form, as shown in FIG. 10, the support may be in the form of a flat wall 106 with an opening 108 therethrough in which the bracket assembly 32 with the camera 12 thereon may be mounted, as by attachment to a stud/floor joist 110 on vertical/horizontal walls, respectively. The components 24 are mounted on the wall 106 and cooperate with the components 22 on the shield member 72, as described above. As noted above, the wall 106 may be made from a magnetized or other metal material that the components 22 are attracted to. An arcuate or annular rim may alternatively be added to allow its shield member 72 to be put in place in different angular orientations.

Figure 11:
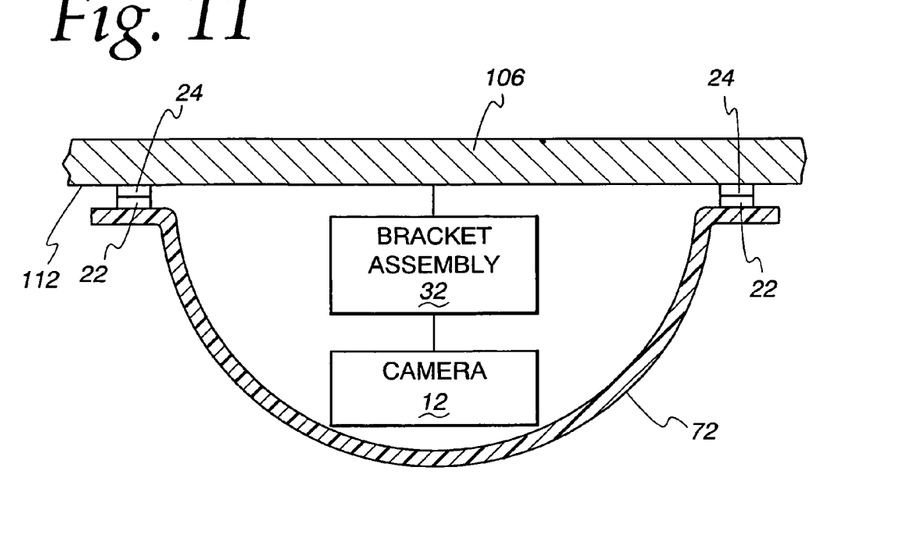
FIG. 11 is a view as in FIG. 10 wherein the security surveillance system is surface mounted.

Alternatively, as shown in FIG. 11, the bracket assembly 32, camera 12, and shield member 72 may be mounted on a flat surface 112 on the wall 106, as shown. The components 22, 24 cooperate as previously described.

Figure 12:
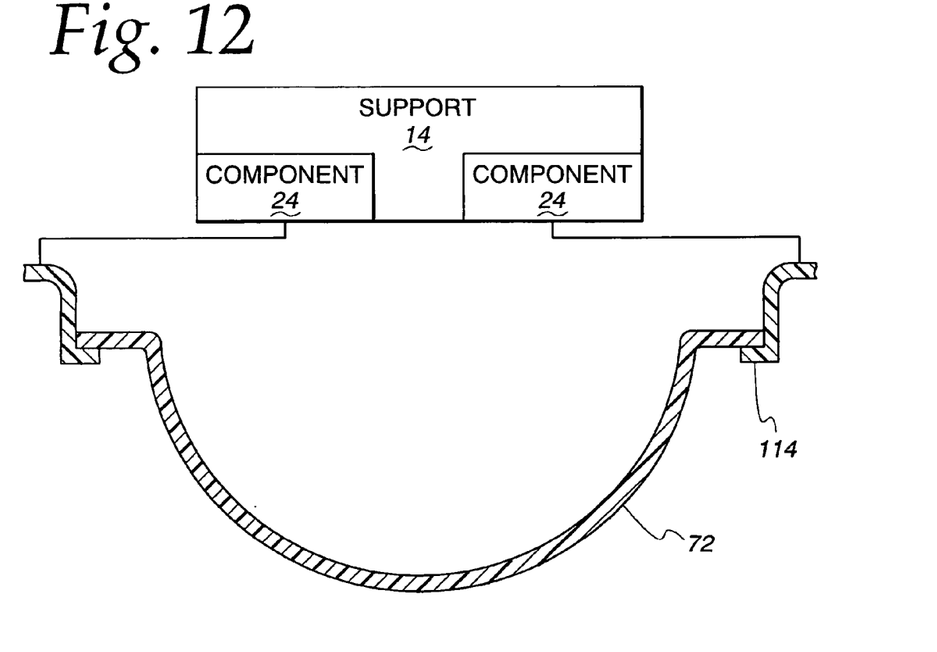
FIG. 12 is a view as in FIGS. 10 and 11 wherein a collar is utilized as part of the cover assembly for connection to the support.

As an alternative to direct mounting of the shield member 72, as shown in FIG. 12, an annular collar 114 may be provided in association with the shield member 72 to facilitate mounting. As one example, the collar 114 can be made from metal to be attracted to the components 24 on the support 14, that may be magnetized, to obviate the need to use discrete components upon the shield member 72. Accordingly, the shield member 72 can be made entirely from a plastic material that can be maintained on the support 14 by the collar 114, without any modification to the basic plastic component.

Figure 13:
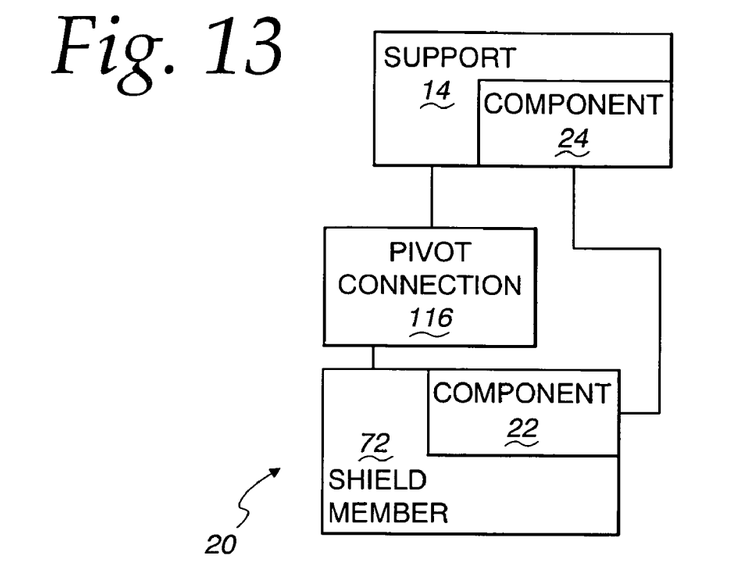
FIG. 13 is a schematic representation of a further modified form of security surveillance system, according to the present invention, wherein a shield member on the cover assembly is pivotably connected to the support.

A further modified form of the invention is shown in FIG. 13, wherein the shield member 72 is maintained on the support 14 through a pivot connection 116. The shield member 72 can be pivoted away from the support 14 to place the cover assembly 20 in the access state. Pivoting in an opposite direction in the same path causes the components 22, 24, on the shield member 72 and support 14, to be mutually attracted to thereby maintain the operative state for the shield member 72.

The above described embodiments are exemplary in nature only. Many variations from the structures described are contemplated. As but one example, the depicted shape of the shield member 72 is not critical to the present invention. A flat shield member may be used or a shield member having another shape may be employed, depending upon the configuration of the other system components.

The shield member 72 may be made from plastic, glass, or other material, or a combination of such, or other, materials.

As noted above, metal magnetized/non-magnetized materials may be used to simplify manufacture and in such a manner that the cover assembly 20 can be installed without requiring any specific angular orientation. Further, if part of the support 14, surveillance device 12, and/or control 18 is made from metal, the invention can be potentially simply and inexpensively produced by adding one or more discrete magnetic components to the cover assembly 20.

Figure 14:
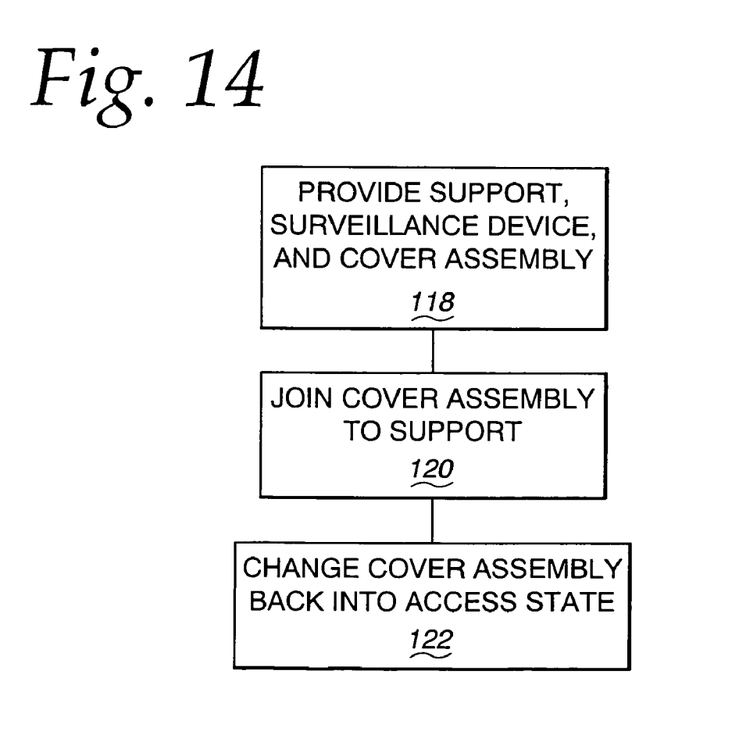
FIG. 14 is a flow diagram representation of a method of operating a security surveillance system, according to the invention, as with the structure shown in FIGS. 1-13.

With the structure as described above, and the many variations contemplated hereby, a method can be practiced as shown schematically in FIG. 14. Specifically, as shown at block 118, a support, surveillance device, and cover assembly are provided. As shown at block 120, the cover assembly is joined to the support, with the cover assembly initially in the access state, by repositioning at least a part of the cover assembly relative to the support, as an incident of which the cover assembly achieves, and is maintained in, the operative state. Thereafter as shown at block 122, the cover assembly is changed from the operative state back into the access state by exerting a force on at least part of the cover assembly of a magnitude that exceeds the magnitude of a force that maintains the cover assembly on the support in the operative state. This process can be performed with virtually a limitless number of variations in structure utilizing the basic principles described above.

The foregoing disclosure of specific embodiments is intended to be illustrative of the broad concepts comprehended by the invention.

The invention claimed is:

1. A security surveillance system comprising:
   a support;
   a surveillance device mounted on the support; and
   a cover assembly, the cover assembly comprising a shield member with a convex shape having an outer periphery and a flange that extends around and outwardly from the periphery of the convex shape, the cover assembly changeable selectively between: a) an access state wherein at least a first operating state of the surveillance device can be changed by an operator at, or in the vicinity of, the surveillance device; and b) an operative state wherein the cover assembly blocks access by an operator as would permit changing of the first operating state by an operator at or in the vicinity of the surveillance device, the cover assembly having a first component and the support having a second component, the first component residing substantially fully outside of the periphery of the convex shape, the first and second components mutually attracted to each other and located so that an operator can move at least a part of the cover assembly with the cover assembly in the access state in: a) a first path in a first direction as an incident of which the cover assembly is caused to be placed in the operative state and maintained in the operative state by a first attractive force between the first and second components; and b) the first path in a direction opposite to the first direction with the cover assembly in the operative state, at least initially under a force greater than the first force to thereby change the cover assembly from the operative state into the access state.

2. The security surveillance system according to claim 1 wherein one of the first and second components comprises a magnetized material and the other of the first and second components is one of: a) a magnetized material; and b) a metallic material.

3. The security surveillance system according to claim 1 wherein with the cover assembly in the access state, the at least part of the cover assembly is fully separated from the support.

4. The security surveillance system according to claim 3 further comprising a tether for connecting the at least part of the cover assembly to the support with the cover assembly in the access state.

5. The security surveillance system according to claim 1 wherein the support comprises a wall and a bracket assembly on the wall.

6. The security surveillance system according to claim 1 wherein the surveillance device comprises a camera.

7. The security surveillance system according to claim 1 wherein the at least part of the cover assembly is movable in substantially a straight line in the first path.

8. The security surveillance system according to claim 1 wherein the cover assembly has a third component that resides substantially fully outside of the periphery of the convex shape and the support has a fourth component, the third and fourth components mutually attracted to each other and located so that the cover assembly is maintained in the operative state cooperatively by the first attractive force and a second attractive force between the third and fourth components, wherein the first and third components are discrete components that are spaced fully from each other by a substantial distance around the periphery of the convex shape.

9. The security surveillance system according to claim 8 wherein the third and fourth components are caused to be attracted to each other as an incident of the at least part of the cover assembly being moved in the first path in the first direction with the cover assembly initially in the access state and the security surveillance system further comprises angular aligning components on the cover assembly and support that cooperate to facilitate angular alignment of the cover assembly and support so that the first and second and third and fourth components can attract each other.

10. The security surveillance system according to claim 1 wherein the shield member has opposite first and second sides, the first side is exposed to the surveillance device, and the shield member obstructs viewing of the surveillance device from at the second side of the shield member.

11. The security surveillance system according to claim 10 wherein the shield member has a rounded shape at the second side.

12. The security surveillance system according to claim 11 wherein the cover assembly comprises a separate collar that extends around the shield member and the first component is on the collar.

13. The security surveillance system according to claim 12 wherein the support comprises a wall and a bracket on the wall and the second component is on the bracket.

14. The security surveillance system according to claim 13 wherein the bracket comprises an elongate tubular element.

15. The security surveillance system according to claim 5 wherein the support comprises a housing defining a receptacle for the surveillance device.

16. The security surveillance system according to claim 15 wherein the receptacle is spaced from the wall.

* * * * *

UNITED STATES PATENT AND TRADEMARK OFFICE
CERTIFICATE OF CORRECTION

PATENT NO. : 7,628,551 B2 Page 1 of 1
APPLICATION NO. : 11/411743
DATED : December 8, 2009
INVENTOR(S) : Leyden et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 850 days.

Signed and Sealed this

Second Day of November, 2010

David J. Kappos
*Director of the United States Patent and Trademark Office*